United States Patent [19]
McCardell

[11] 3,978,334
[45] Aug. 31, 1976

[54] PRECISION LASER BEAM DEFLECTION DETECTOR
[75] Inventor: Peter D. McCardell, San Diego, Calif.
[73] Assignee: The United States of America as represented by the Secretary of the Navy, Washington, D.C.
[22] Filed: Sept. 24, 1975
[21] Appl. No.: 616,237

[52] U.S. Cl. .............................................. 250/225
[51] Int. Cl.² ...................... G02F 1/01; H01J 39/12
[58] Field of Search .................... 250/225; 350/150; 324/96

[56] References Cited
UNITED STATES PATENTS
3,675,125   7/1972   Jaecklin .......................... 250/225 X
3,708,747   1/1973   Lesueur ............................... 324/96
3,754,143   8/1973   Lesueur .......................... 350/150 X
3,778,619   12/1973  Carnel ............................... 250/225

Primary Examiner—Alfred E. Smith
Assistant Examiner—David K. Moore
Attorney, Agent, or Firm—Richard S. Sciascia; Ervin F. Johnston; William T. Skeer

[57] ABSTRACT

An improved optical measuring system for measuring the deflection or displacement of a beam of coherent light energy is disclosed as including a Faraday rod having magneto-optical properties in conjunction with a polarizer and analyzer at the entrance and exit pupils thereof and a photodetector with lock-in amplifier which, in turn, controls a magnetic control means operatively associated with the Faraday rod.

11 Claims, 3 Drawing Figures

PRECISION LASER BEAM DEFLECTION DETECTOR

STATEMENT OF GOVERNMENT INTEREST

The invention described herein may be manufactured and used by or for the Government of the United States of America for governmental purposes without the payment of any royalties thereon or therefor.

FIELD OF THE INVENTION

This invention pertains to the field of philosophical instruments. By way of further characterization, this invention pertains to the field of physical measurement instruments. By way of further characterization, this invention pertains to the field of electro-optical measuring. By way of further charcterization, but without limitation thereto, this invention pertains to the measurement of deflection and displacement of light energy.

DESCRIPTION OF THE PRIOR ART

Electro-optical instrumentation in the prior art is used for a wide variety of applications. In general, a beam of photon energy is caused to impinge an object under test and, depending upon the material, be reflected therefrom or transmitted therethrough such that the physical condition, placement, or construction of the object causes a deflection or displacement of the energy beam. In the past, the measurement of this deflection or displacement has generally been accomplished by passing the photon energy beam through a small aperture and measuring the intensity variations of the beam on the opposite side of the aperture or, alternatively, tracking the movement with a feedback system that moves the aperture. Although satisfactory in many applications, the prior art systems have proved inaccurate and difficult to use for a very small angular movement of the photon beam.

SUMMARY OF THE INVENTION

This invention overcomes the disadvantages of the prior art constructions by providing an improved construction whereby the photon beam after interaction with the material under test is polarized and caused to pass through a magneto-optic environment which rotates the polarization of a light beam such that a predetermined variation may be consistently obtained and maintained. The polarized light beam is then analyzed by a suitable polarizing analyzer and the intensity is detected by means of photoelectric instrumentation, conventional in the art. This detected output is utilized by a lock-in amplifier to control the magneto-optical rotation caused by the Faraday rod. The amount of electrical energy necessary to effect the change is then an indication of the amount of displacement of deflection experienced by the photon beam.

STATEMENT OF THE OBJECTS OF INVENTION

It is accordingly an object of this invention to provide an improved measuring system.

A further object of this invention is the provision of a photoelectrical optical system which is responsive to small deflections and displacements of a light beam.

An additional object of this invention is to provide an optical measuring system responsive to small angular deflections of a beam of coherent light.

A further object of this invention is to provide a photoelectrical optical system which employs a Faraday rod polarizer to establish a predetermined amount of polarization in a beam of photon energy.

These and other objects of the invention will become more readily apparent from the ensuing specification when taken together with the drawings.

DESCRIPTION OF THE PREFERRED EMBODIMENT

Figure 1:
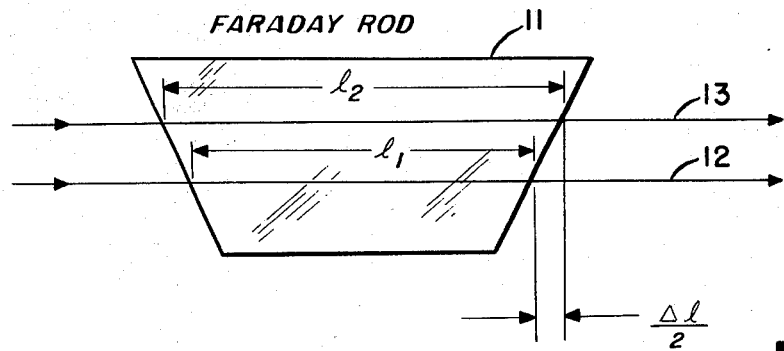
FIG. 1 is an elevation view of an optical element of the invention showing the optic paths therethrough.

Referring to FIG. 1, a beam path diagram is shown of two displaced light beams 12 and 13 passing through an optical element 11. Optical element 11 is a Faraday rod which is a trapezohedron prism or cylinder which exhibits a magneto-optic rotation of polarized energy passing therethrough. As may be readily seen, a light beam 12 impinging Faraday rod 11 one one non-parallel face is transmitted therethrough to exit on the opposite face and having an optical length therein indicated at $l_1$. For the purposes of simplicity, refraction of light beam 12 is ignored for purposes of the propaedeutic description of the theory of operation. No loss of accuracy is occasioned by this simplification since the entrance and exit refraction are compensatory and the relative lengths within Faraday rod 11 remain constant.

Should light beam 12 be displaced to occupy a different beam path such as shown at 13, the length within Faraday rod 11 would be altered to that shown at $l_2$. Clearly, as shown in the figure, the change in light path, $\Delta l$, is a function of the geometry of the Faraday rod 11 and is indicative of the amount of displacement experienced by light beam 12.

Figure 2:
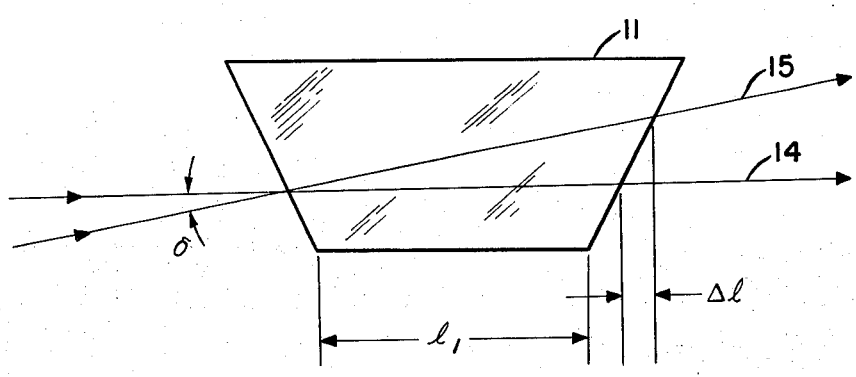
FIG. 2 is a side elevation view of the optical element illustrated in FIG. 1 showing the alteration of optical path length caused by an angular deflection of the light beam.

Referring to FIG. 2, the effect of an angular displacement of light beam 14 is shown to result in a similar change of optical path length within Faraday rod 11. That is, if the light beam 14 is deflected through an angle $\sigma$, to occupy a beam path 15 an alteration of the transmitted light path length, $\Delta l$ results from the different path length within rod 11. If each end of the Faraday rod is bevelled at the same angle, a simplified geometric relationship between the path length and the amount of displacement of the beam may be conveniently established.

Linearly polarized light which is instant upon magnetic material in which the magnetism is parallel to the light path emerges as elliptically polarized light. The major axis of the elliptical polarization component is rotated by the magnetization through an angle known as the Faraday rotation angle which is proportional to the magnetization of the material and also to the path length in the material. The constant proportionality indicative of the magnitude of this rotation, known as Kundt's constant is conveniently given for a variety of materials in degrees per gauss-centimeter. Different constants of proportionality are given for different materials and are readily attainable in standard reference works. For example, the American Institute of Physics Handbook published by McGraw Hill Book Company, Copyright 1972, lists the constants and other magneto-optical parameters of a variety of materials which may be used in the practice of the invention. Commonly, such materials are held in a fixed suspension in an optical glass medium and are marketed commercially by a variety of optical supply companies. Choice as between various ones of these available constructions are made in dependence upon their physical size, cost, and optical properties.

Since small displacements change the path length in Faraday rod 11 by an amount which is proportional to the displacement distance times the tangent of the face angle. The total path variation may be given by twice the product of the displacement distance times the tangent of the face angle. Of course, this change in path length is accompanied by a change in the rotational angle caused by the action of the Faraday rod on an elliptically polarized light which may be considered the product of the Kundt's constant multiplied by the magnetic field strength and the change in path length. This may be conveniently represented by the mathematical expression:

$$\Delta\phi = 2KM\epsilon\tan\theta,$$

where;
$K$ is Kundt's constant given in degrees per gauss-cm,
$M$ is the magnetization of the Material,
$\epsilon$ is displacement distance, and
$\theta$ is the face angle of the Faraday.

Similarly, for an angular change in the light beam the difference in path length can be shown to be the displacement distance, $h$, times the tangent of the face angle, and since the displacement of the exit light beam may be shown to be equal to $l$ times the tangent of $\sigma$ one can show that the change in polarization angle is given by an expression:

$$\Delta\phi = KMl\tan\sigma\tan\theta.$$

Using conventional algebraic approximations, the tangent of $\delta$ may be replaced by $\delta$ and the equation may be simplified by:

$$\Delta\phi = 2VB\epsilon'\tan\theta,$$

where;

$$\epsilon' = l\delta/2.$$

Thus, it may be seen that for the very small deflection or displacements of interest, the approximations are of the same form. Of course, this is of great value in equipment construction or calibration.

In practical applications the face angles of the Faraday rod are approximately 60° and with the magnetic field B equal to approximately 1 kilogauss and with readily attainable Kundt's constants on the order of one tenth of a minute per centimeter gauss it may be shown that displacements on the order of one micron may be detectable with this system if a proper magnetic control system is utilized.

Figure 3:
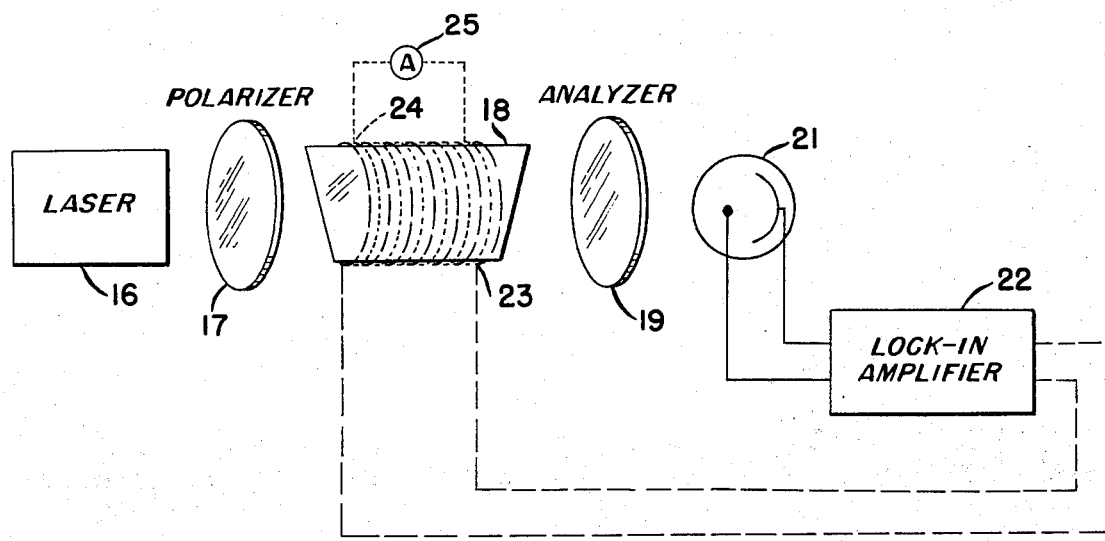
FIG. 3 is a schematic representation of the system of the invention.

Referring to FIG. 3, a schematic representation of the system of the invention is illustrated. A source of coherent light 16, which may, for example, comprise a laser light source is positioned to emit a beam of light establishing an optical axis along its transmission path. A polarizer 17 is positioned to intercept this light beam and to effect a plane polarization thereof. Polarizer 17 may be of any type providing the desired degree of plane polarization and may, for example, comprise a sheet of commercially available sheet polarizing material. A Faraday rod 18 is positioned to receive a beam of polarized light from polarizer 17 and to effect an elliptical polarization thereof as previously described.

Of course, the light output from laser 16 may intercept a sample of material under test or a structural member undergoing analysis. Since a wide variety of sample testing arrangements are known in the prior art, no particular sample holder arrangement for object interaction is illustrated.

Faraday rod 18 effects an elliptical polarization of light and the light output therefrom impinges an analyzer 19. Analyzer 19, like polarizer 17, may be fabricated from conventional sheet polarizing material and is positioned to provide a predetermined degree of attenuation for the light beam incident upon the acts of self-polarization thereof. The output from analyzer 19 impinges photodetector 21. Photodetector 21 may be any conventional, high sensitivity detector and may, for example, comprise a solid state phototransistor or, if desired, a photodiode. The output of photodetector 21 is coupled to lock-in amplifier 22. Lock-in amplifier 22 may, for example, be any conventional laboratory lock-in amplifier having the desired sensitivity and power rating output and selection between various units which are available may be made in accordance with conventional trade-offs of the known operational characteristics. However, for purposes of illustration and completeness, it should be noted that lock-in amplifier 22 may be that manufactured by Princeton Applied Research Corporation of Princeton, New Jersey and marketed under the trade designation of model 186A, Synchro-Het amplifier. Such an instrument has a one nanovolt sensitivity and a high input impedance. The output of lock-in amplifier 22 is connected to a coil 23 encircling Faraday rod 18 such that the magnetic field generated thereby is parallel to and coaxially oriented with respect to the output of laser 16 and the optical axis of the system.

Thus, lock-in amplifier 22 functions to return the light energy falling on photocell 21 to the predetermined intensity level established initially by analyzer 19. An electrical measuring instrument 25 is inductively coupled to coil 18 by means of a pick-up coil 24 such that the amount of magnetic field change required to restore the system of FIG. 3 to its operationally predetermined point may be conveniently measured. Electrical measuring instrument 25 may be, for example, an ammeter presenting a fixed load which is calibrated to indicate the change of magnetic field.

For purposes of illustration clarity, coils 23 and 24 and the electrical connections thereto are shown in broken lines having a different segment length.

The foregoing description taken together with the appended claims constitutes a disclosure such as to enable a person skilled in the electronics and optical instrumentation arts and having the benefit of the teachings contained therein to make and use the invention. Further, the structures herein described meet the aforestated objects of invention, and generally constitutes a meritorious advance in the art unobvious to such a worker not having the benefit of these teachings.

Obviously, many modifications and variations of the present invention are possible in the light of the above teachings, and it is therefore understood that within the scope of the disclosed inventive concept, the invention may be practiced otherwise then specifically described.

What is claimed is:

1. In an optical measuring system including a source of coherent light, an electro-optical system for quantitively determining deflection or displacement of the light output from said source of coherent light and having an optical axis comprising:

polarizer means located on the optical axis of the electro-optical system for establishing an axis of polarization for the source of coherent light;

a Faraday rod having non-parallel entrance and exit faces spaced apart along a longitudinal axis which is located on the optical axis of the electro-optical system to transmit the polarized output from the polarizer means through a predetermined length thereof;

analyzer means located on the optical axis of the electro-optical system and positioned for receiving the light output from said Faraday rod;

electro-optical detector means located on the optical axis of the electro-optical system in operative relation with respect to said analyzer means for intercepting the output therefrom and for generating an electrical analog therefrom;

amplifier means connected to said electro-optic detector means for amplifying the electrical analog output therefrom and for developing a control signal therefrom;

control means operatively connected to said amplifier means for receipt of said control signal therefrom and positioned in operative relation to said Faraday rod for control thereof; and measuring means indirectly connected to said control means for sensing and displaying the magnitude of the control signal supplied thereto by said amplifier means, whereby a predetermined optical condition within said optical measuring system may be maintained as an indication of optical activity within the system.

2. An electro-optical system according to claim 1 in which said polarizer means including a sheet polarizer.

3. An electro-optical system according to claim 1 in which said analyzer means includes a sheet polarizer.

4. An electro-optical system according to claim 1 in which said electro-optical detector means is a solid-state photodetector.

5. An electro-optical system according to claim 1 in which said amplifier means includes a low-drift, lock-in amplifier.

6. An electro-optical system according to claim 1 in which said Faraday rod includes a quantity of magneto-optical material held within a glass matrix.

7. An electro-optical system according to claim 6 in which said Faraday rod has a magneto-optical axis which is positioned to be in alignment with the optical axis of the electro-optic system.

8. An electro-optical system according to claim 1 in which said control means includes a magnetic energy generating transducer in operative cooperation with the aforesaid Faraday rod.

9. An electro-optical system according to claim 8 in which said magnetic energy generating transducer includes a coil encircling said Faraday rod.

10. An electro-optical system according to claim 9 in which said coil is positioned to be co-axial with the optical axis of the system.

11. An electro-optical system according to claim 9 in which said measuring means includes an electrical measuring system which is inductively coupled to said coil.

* * * * *